Figure 5:
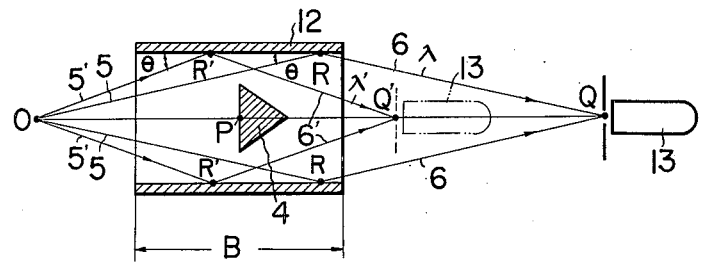

FIG. 1
FIG. 2A
FIG. 2B
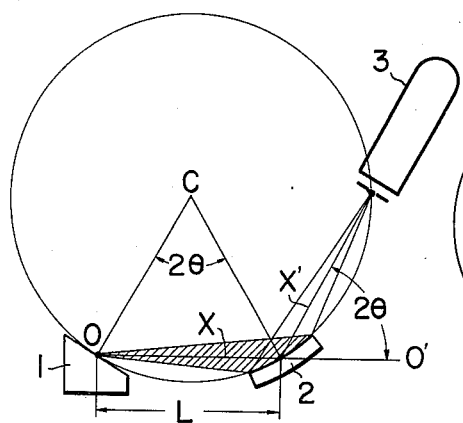
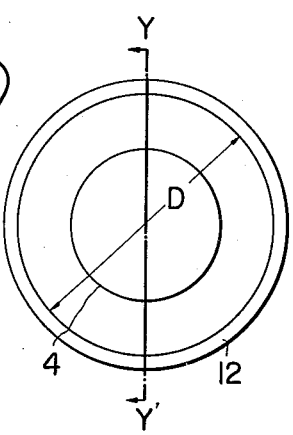
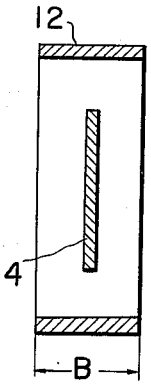
FIG. 3
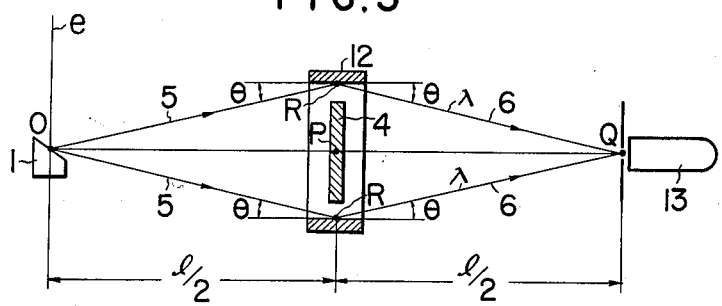
FIG. 4
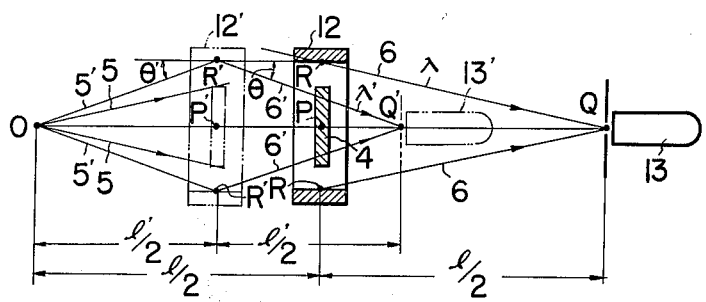

United States Patent Office 3,242,335
Patented Mar. 22, 1966

3,242,335
DETECTOR FOR X-RAY SPECTROSCOPES WITH MEANS TO DETECT DIFFERENT WAVELENGTHS OF X-RADIATION
Hiroshi Watanabe, Kitatama-gun, Tokyo-to, Shinjiro Katagiri, Kodaira-shi, and Susumu Ozasa, Itabashi-ku, Tokyo-to, Japan, assignors to Kabushiki Kaisha Hitachi Seisakusho, Tokyo-to, Japan, a joint-stock company of Japan
Filed May 15, 1963, Ser. No. 280,524
Claims priority, application Japan, May 18, 1962, 37/19,737
6 Claims. (Cl. 250—51.5)

The present invention relates to X-ray spectroscopy, and more particularly it relates to improvements in and relating to X-ray spectroscopes suitable for use in, for example, X-ray micro-analyzers.

In an apparatus such as an X-ray micro-analyzer, the wavelength of the X-rays emitted from a point X-ray source (analysis point) established on the surface of a sample is analyzed by means of a wavelength spectroscope to carry out analysis of the sample composition. In general, however, the point X-ray source is very small, and, in addition, the intensity of the emitted X-rays is substantially weaker than that in the case of an ordinary X-ray tube and the like. For this reason, the detection of the X-rays after their diffraction in a wavelength spectroscope is extremely difficult. Furthermore, it has been considered that, since X-rays of a long wavelength component are particularly subject to absorption in the path from the point X-ray source to the detector, the rays reaching the detector become even weaker and even more difficult to detect.

One method and apparatus for overcoming the above-stated difficulty which have heretofore been carried into practice have been accompanied by other difficulties and disadvantages as will be described in greater detail hereinafter.

It is an object of the present invention, in its broader aspects, to eliminate the above-mentioned disadvantages and difficulties.

The nature, principle, and details of the invention will be best understood by reference to the following description, taken in conjunction with the accompanying drawing in which like parts are designed by like reference numerals and letters, and in which:

FIG. 1 is a schematic arrangement diagram showing one example of a conventional X-ray spectroscope;

FIG. 2(a) and (b) are respectively plan and elevational views showing the construction of the essential parts of one embodiment of the X-ray spectroscope according to the invention, (b) being in section taken along the line Y–Y' of (a); and FIGS. 3 through 7, inclusive, are schematic arrangement diagrams presented for description of the spectroscopic actions of other embodiments of the invention.

Referring to FIG. 1, in the afore-mentioned conventional X-ray spectroscopic method, the X-rays X emitted from the analysis point O of a sample 1 are diffracted by means of a bent-crystal 2 having a lattice constant $d$. Then, the X-rays X' having the wavelength $\lambda$ to be detected are focused on the window of a detector 3 with the aim of increasing the intensity of the X-rays X' subsequent to diffraction. This method, however, has disadvantages such as complicated converging conditions and the lengthening of the distance between the X-ray source and the detector with increase in the wavelength, the said lengthening causing increases in the absorption of the X-rays in its path.

The present invention, which contemplates the elimination of the above-described disadvantages, provides a new and original X-ray spectroscope of extremely simple construction wherein the wavelength of X-rays radiated in all directions from the analysis point of a sample are analyzed, then the X-rays of the wavelength to be detected are focused on a detector. A unique feature of this spectroscope is that the required path from the X-ray source to the detector becomes shorter with increase in the lentgh of the X-ray wavelength.

In one embodiment of the invention as shown in FIG. 2, the spectroscope consists, essentially, of a single crystal 12 of the shape of a circular cylinder having lattice planes parallel to the circular cylinder surface and a shielding plate 4 for arresting X-rays traveling in a straight line, the said shielding plate 4 being concentrically disposed within the cylindrical crystal 12.

The diffraction action and focusing action of the X-ray spectroscope of this invention of the above-described construction may be described as follows with reference to FIG. 3. In the arrangement shown in FIG. 3, there are disposed, in coaxial alinement, the analysis point O of a sample 1, a cylindrical single crystal 12, a shielding plate 4 concentrically disposed within the crystal 12, and an X-ray detector 13. An electron ray $e$ is projected onto the sample 1, whereby primary X-rays 5 are radiated in all directions from the analysis point O of the sample 1. The primary X-rays 5 reaching the single crystal 12 are reflected thereby, and monochromatic X-rays 6 of wavelength $\lambda$ are produced and focused at a focal point Q axially situated immediately in front of the detector 13. The cylindrical single crystal 12 is so disposed that its centerline coincides with the straight line joining the aforesaid analysis point O and the focal point Q, and that, at the same time, its center point P is positioned at approximately the midpoint of the line O–Q joining the analysis point O and the focal point Q designating the position of the X-ray detector 13.

It will be considered that the primary X-rays 5 emitted from the analysis point O are projected with an incidence angle $\theta$ onto a point R in the central region on the inner cylindrical surface of the single crystal 12. Then, only the incident X-rays have a wavelength $\lambda$ satisfying the condition of Bragg's law, as represented by the equation: $2d \sin \theta = n\lambda (n=0, 1, 2, \ldots)$, where $d$ is the lattice constant in the inner surface of the single crystal 12, are reflected intensely in the direction of the X-rays 6, and the reflected X-rays 6 are focused at the point Q at the front of the detector 13. The X-rays traveling in a direct line from the analysis point O toward the detector 13 are stopped by the shielding plate 4.

Thus, it becomes possible to select and reflect only the rays of a certain wavelength $\lambda$ from among the X-rays of various different wavelengths which are radiated and scattered from the analysis point O and are projected onto the circumference R. As a result, the X-ray input into the detector 13 is of a magnitude which increases several times to several tens of times that of the corresponding input in a conventional apparatus. Accordingly, the detection in the spectroscope of the present invention is facilitated, and, as a practical effect, it is possible to reduce the analysis point to extremely small size and to increase the precision of analysis.

When X-rays of other wavelengths are to be spectroscopically measured, the cylindrical single crystal 12 and the detector 13 are shifted axially in such a manner that their positions relative to each other are maintained in a relationship such that the center point P of the crystal 12 is always at the midpoint of the line joining the analysis point O and the focal point Q, as indicated in FIG. 4. For X-rays of a wavelength $\lambda'$, the crystal 12 and the detector 13 are shifted to respective positions (shown by dotted lines in FIG. 4) which will cause the incidence angle relative to the lattice planes of the crystal 12' to be of a value $\theta'$ such that the Bragg condition as represented by $2d \sin \theta' = n\lambda'$ ($n=0,1,2,\ldots$) is satisfied. In this case, of the X-rays 5' of mixed wavelengths radiated from the analysis point O, only the X-rays 6' of the particular wavelengths $\lambda'$ are intensely reflected, focused at a point Q', and detected by the detector shifted to the position 13' corresponding to the point Q'.

It is a significant feature of the present invention that, in the above case, if the wavelength $\lambda'$ of the X-rays is greater than $\lambda$, the distance $l'$ between the analysis point O and the focal point Q' will be less than the distance $l$ between the points O and Q, wherefore a short path suffices for X-rays of long wavelengths.

While, in the above-described embodiment, the crystal 12 and the detector 13 are both shifted to positions in accordance with the wavelengths of the X-rays to be detected, it is also possible to detect X-rays of different wavelengths by fixing the cylindrical crystal 12 at a certain position and shifting only the detector 13 along the axis of the cylindrical crystal 12 provided that the length B in the axial direction of the cylindrical crystal 12 is made sufficiently long as indicated in FIG. 5. By this arrangement, X-rays of different wavelengths are selectively reflected at respectively different points on the crystal such as R and R'.

The single crystal 12 bent into a cylindrical form is not necessarily a single, integral structure. It may consist of several single crystals mutually alined in the crystal direction and bonded together in a cylindrical form. Furthermore, this crystal need not be in the form of a complete cylinder but may be a partial cylinder with a part thereof cut away.

Figure 6:
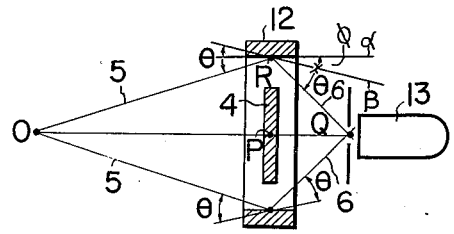
Figure 7:
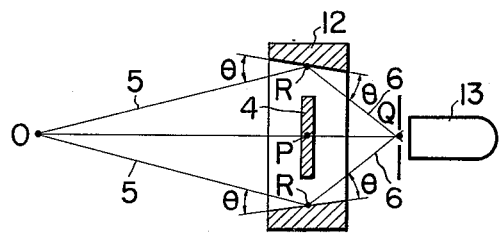

Furthermore, while in the above-described embodiment of the invention, the crystal 12 is always placed at the midpoint between the analysis point O and the detector 13, and the lattice planes of the crystal 12 are orientated to be parallel with the cylindrical surface, the lattice planes may be inclined relative to the cylindrical surface as indicated in FIG. 6, wherein the lattice planes are arranged in parallel with a straight line $\beta$ which passes through point R and is inclined at an angle $\phi$ with respect to the inner surface $\alpha$ of the crystal member, and therefore are in parallel with the conical surface form; thus the lattice planes and the inner surface of the crystal member are not always in parallel state; or the inner surface of the crystal 12 may be made in the form of a frustrum of a cone as indicated in FIG. 7, wherein the lattic planes and the inner surface of the crystal member are parallel to each other in the conical surface form, thereby providing so-called lattice planes of conical surface form in which the lattice planes are inclined relative to the axis O–Q. By this arrangement, the crystal 12 is not positioned midway between the anaylsis point O and the focal point Q, but is positioned at a point which is closer to either of these points O and Q and satisfies the Bragg condition. Accordingly, this arrangement is convenient in certain cases such as, for example, that in which the crystal 12 cannot be made to approach the analysis point O too closely.

As described above, the present invention provides an X-ray spectroscope of extremely simple construction whereby X-rays radiated from an analysis point (point X-ray source) of a sample are caused to converge again at different points, each of which corresponds to X-rays of a certain equal wavelength, and wavelength analysis can be accomplished as X-rays of ample intensity are so obtained. Accordingly, the spectroscope according to the present invention is highly effective in elevating the precision and efficiency of analysis when utilized as an X-ray spectroscope in apparatuses such as X-ray microanalyzers.

Although the present invention has been described with respect to a particular embodiment and a few modifications thereof, it is not to be so limited as numerous other changes and modifications may be made therein which are within the full intended scope of the invention, as defined by the appended claims.

What is claimed is:

1. An X-ray spectroscope comprising: a point X-ray source; an X-ray detector adapted to transmit selected rays of a certain wavelength; at least one single crystal member in the form of a hollow cylinder for reflecting X-rays having a cylindrical inner surface, which is disposed between, coaxially with, and on the common axis with the said point X-ray source and the detector and has parallel lattice planes of concentric cylindrical surface form with a straight line connecting the said point X-ray source and the detector as its axis; at least one shielding plate adapted to arrest X-rays travelling in a direct straight line from the said source, through the hollow part of the said single crystal member, toward said detector; and means for rendering relatively shiftable said single crystal member, shielding plate and detector with respect to the point X-ray source along said axis line, while maintaining said members at a definite position such that the longer the wavelength of the X-ray to be projected into said detector and to be detected, the shorter the length of the X-ray path from the said source to the detector.

2. An X-ray spectroscope comprising: a point X-ray source; and X-ray detector adapted to transmit selected rays of a certain wavelength, at least one single crystal member in the form of a hollow cylinder for reflecting X-rays having a cylindrical inner surface, which is disposed between, coaxially with, and on the common axis with said point X-ray source and the detector and has parallel lattice planes of concentric cylindrical surface form with a straight line connecting said point X-ray source and the detector as its axis; at least one shielding plate adapted to arrest X-rays travelling in a direct straight line from said source, through the hollow part of said single crystal member, toward said detector; and means for rendering relatively shiftable at least said detector with respect to the point X-ray source along said axis line, while maintaining said members at a definite position such that the longer the wavelength of the X-ray to be projected into the said detector and to be detected thereby, the shorter the length of the X-ray path from said source to the detector.

3. An X-ray spectroscope comprising: a point X-ray source; an X-ray detector adapted to transmit selected rays of a certain wavelength, at least one single crystal member in the form of a hollow cylinder for reflecting X-rays having a cylindrical inner surface, which is disposed between, coaxially with, and on the common axis with said point X-ray source and the detector and has parallel lattice planes of concentric conical surface form with a straight line connecting said point X-ray source and the detector as its axis; at least one shielding plate adapted to arrest X-rays travelling in a direct straight line from said source, through the hollow part of said single crystal member, toward said detector; and means for rendering relatively shiftable said single crystal member, shielding plate and detector with respect to the point X-ray source along said axis line, while maintaining said members at a definite position such that the longer the wavelength of the X-ray to be projected into the said detector and to be detected thereby, the shorter the length of the X-ray path from said source to the detector.

4. An X-ray spectroscope comprising: a point X-ray source; an X-ray detector adapted to transmit selected rays of a certain wavelength, at least one single crystal member in the form of a hollow cylinder for reflecting X-rays having a cylindrical inner surface, which is disposed between, coaxially with, and on the common axis with said point X-ray source and the detector and has parallel lattice planes of concentric conical surface form with a straight line connecting said point X-ray source and the detector as its axis; at least one shielding plate adapted to arrest X-rays travelling in a direct straight line from said source, through the hollow part of said single crystal member toward said detector; and means for rendering relatively shiftable at least said detector with respect to the point X-ray source along said axis line, while maintaining said members at a definite position such that the longer the wavelength of the X-ray to be projected into the said detector and to be detected thereby, the shorter the length of the X-ray path from said source to the detector.

5. An X-ray spectroscope comprising: a point X-ray source; an X-ray detector adapted to transmit selected rays of a certain wavelength, at least one single crystal member in the form of a hollow cylinder for reflecting X-rays having a conical inner surface, which is disposed between, coaxially with, and on the common axis with said point X-ray source and the detector and has parallel lattice planes of concentric conical surface form with a straight line connecting said point X-ray source and the detector as its axis; at least one shielding plate adapted to arrest X-rays travelling in a direct straight line from said source, through the hollow part of said single crystal member, toward said detector; and means for rendering relatively shiftable said single crystal member, shielding plate and detector with respect to the point X-ray source along said axis line, while maintaining said members at a definite position such that the longer the wavelength or the X-ray to be projected into said detector and to be detected thereby, the shorter the length of the X-ray path from said source to the detector.

6. An X-ray spectroscope comprising: a point X-ray source; an X-ray detector adapted to transmit selected rays of a certain wavelength, at least one single crystal member in the form of a hollow cylinder for reflecting X-rays having a conical inner surface, which is disposed between, coaxially with, and on the common axis with said point X-ray source and the detector and has parallel lattice planes of concentric conical surface form with a straight line connecting said point X-ray source and the detector as its axis; at least one shielding plate adapted to arrest X-rays travelling in a direct straight line from said source, through the hollow part of said single crystal member, toward said detector; and means for rendering relatively shiftable at least said detector with respect to the point X-rays source along said axis line, while maintaining said members at a definite position such that the longer the wavelength of the X-rays to be projected into said detector and to be detected thereby, the shorter the length of the X-rays path from said source to the detector.

References Cited by the Examiner

UNITED STATES PATENTS

| | | | |
|---|---|---|---|
| 1,865,441 | 7/1932 | Mutscheller | 250—51.5 X |
| 2,881,327 | 4/1959 | Hendee et al. | 250—51.5 X |

RALPH G. NILSON, *Primary Examiner.*

ARCHIE R. BORCHELT, *Examiner.*

H. S. MILLER, G. E. MATTHEWS, *Assistant Examiners.*